ized Mar. 21, 1967

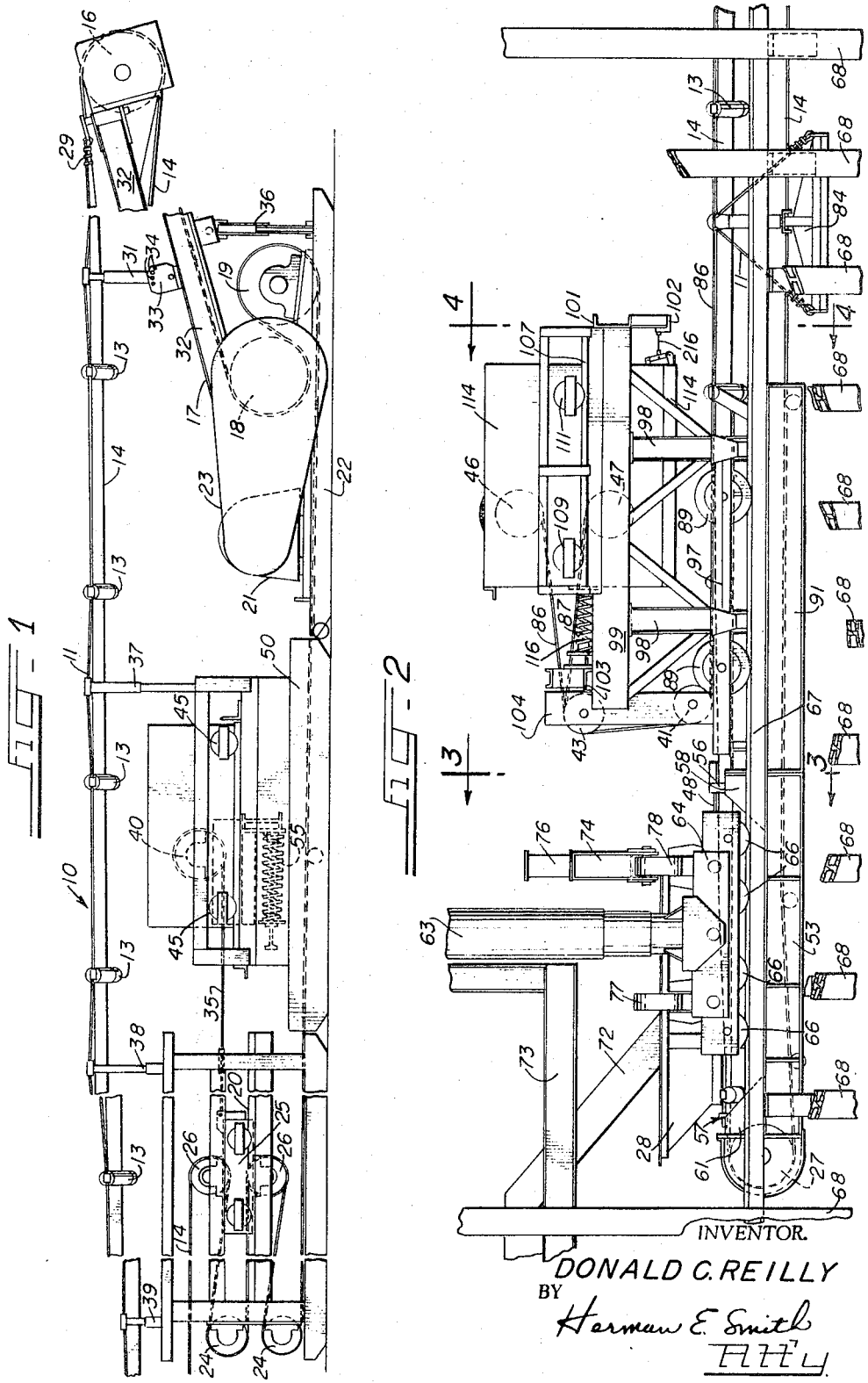

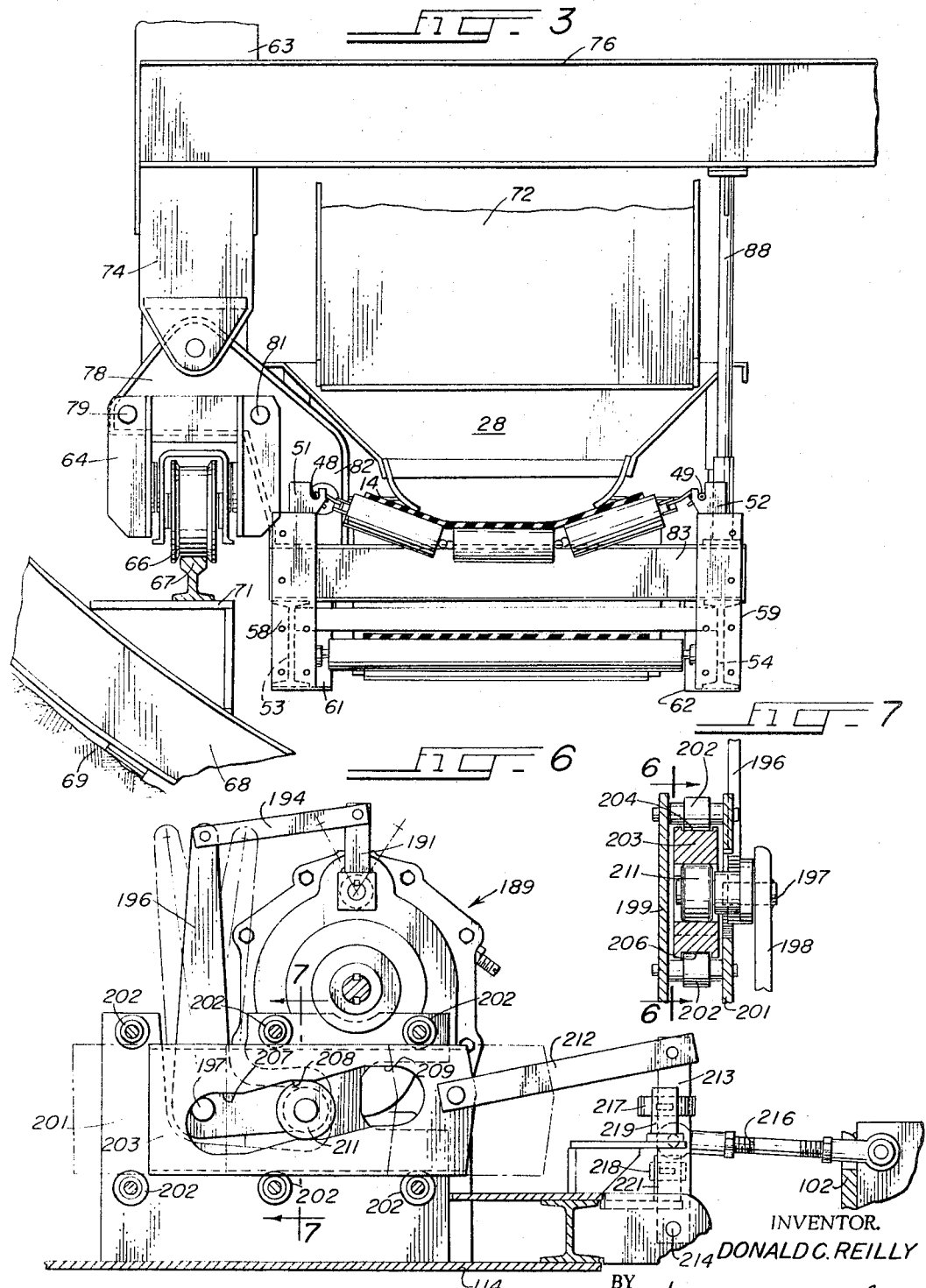

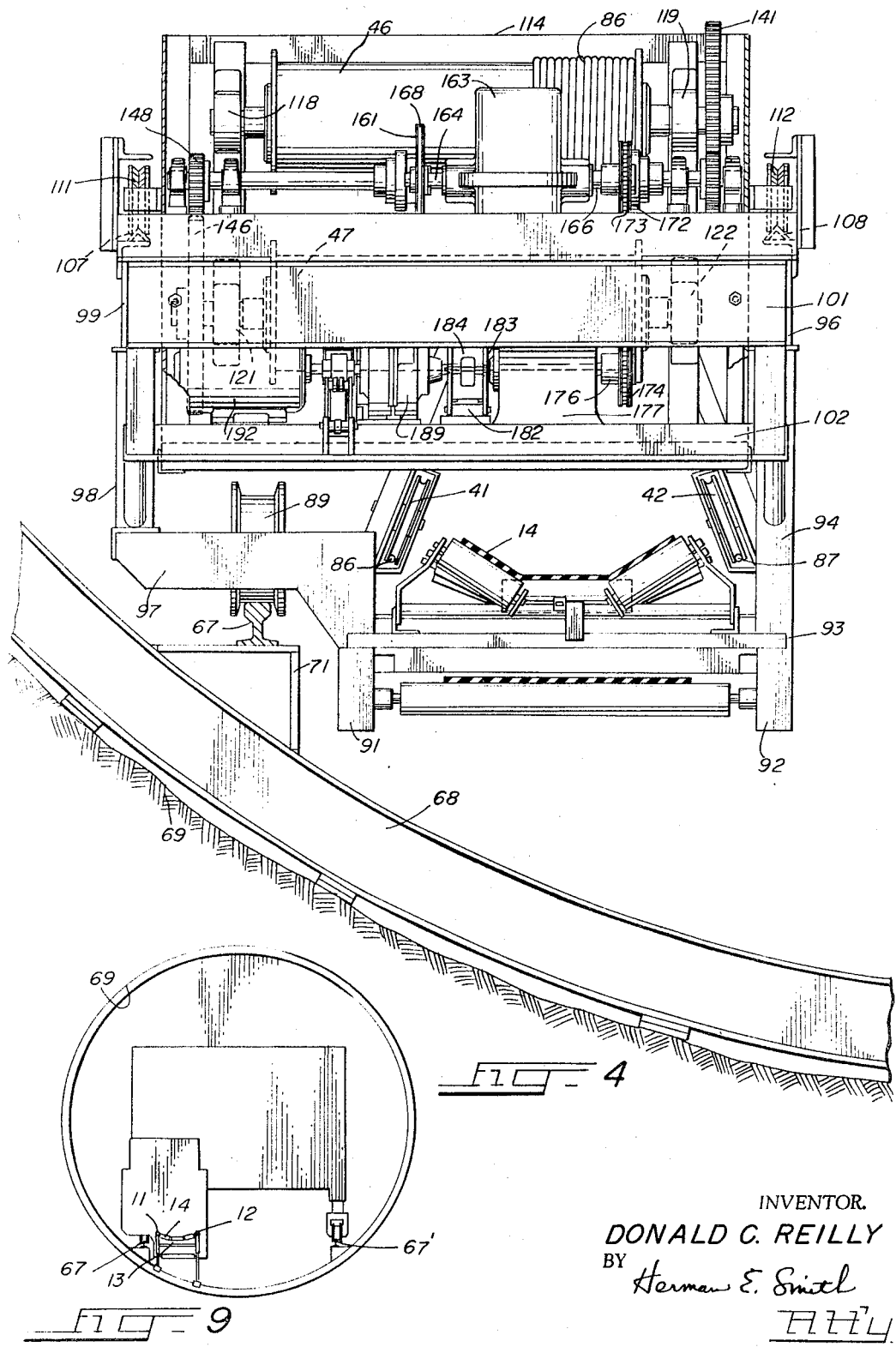

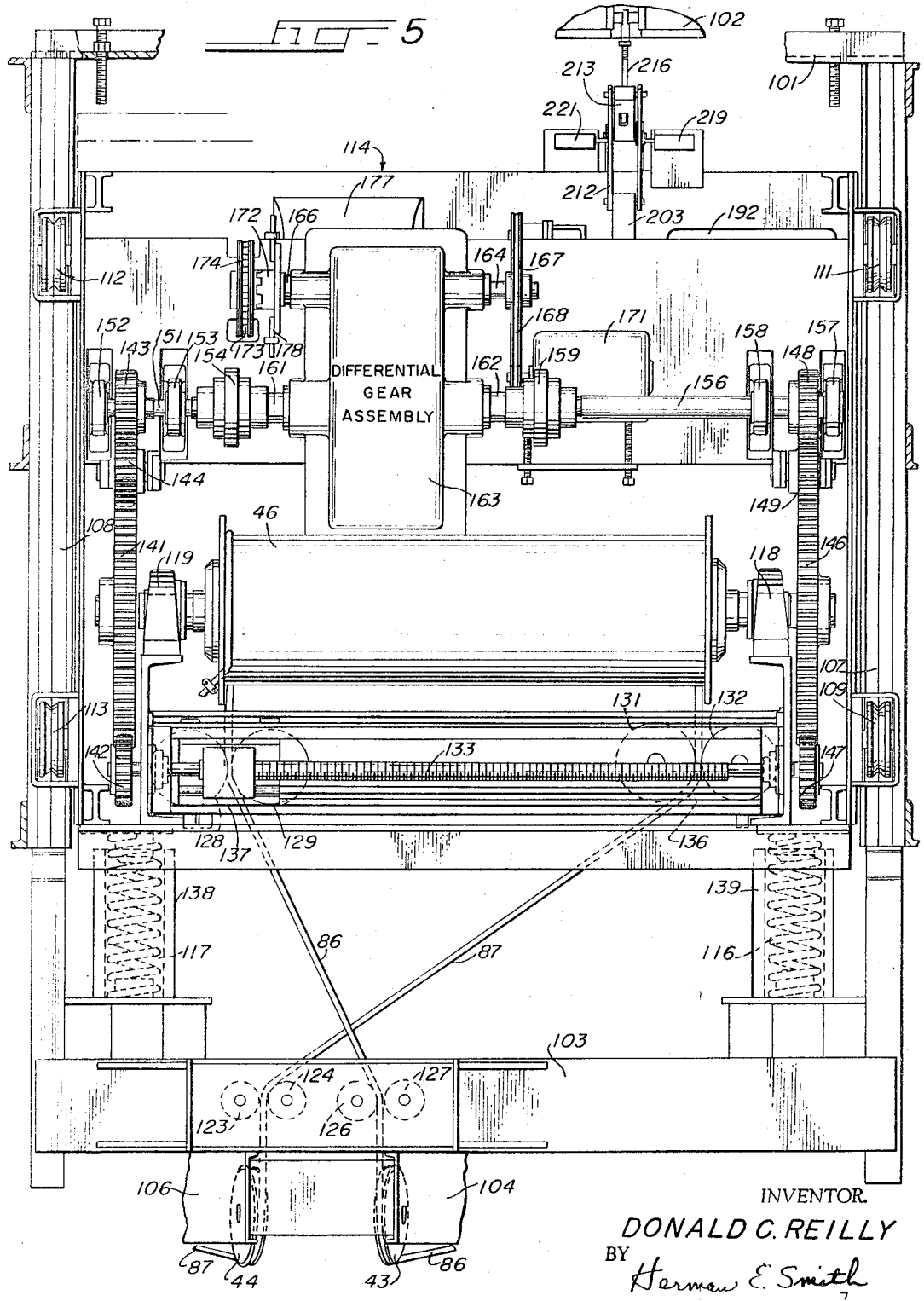

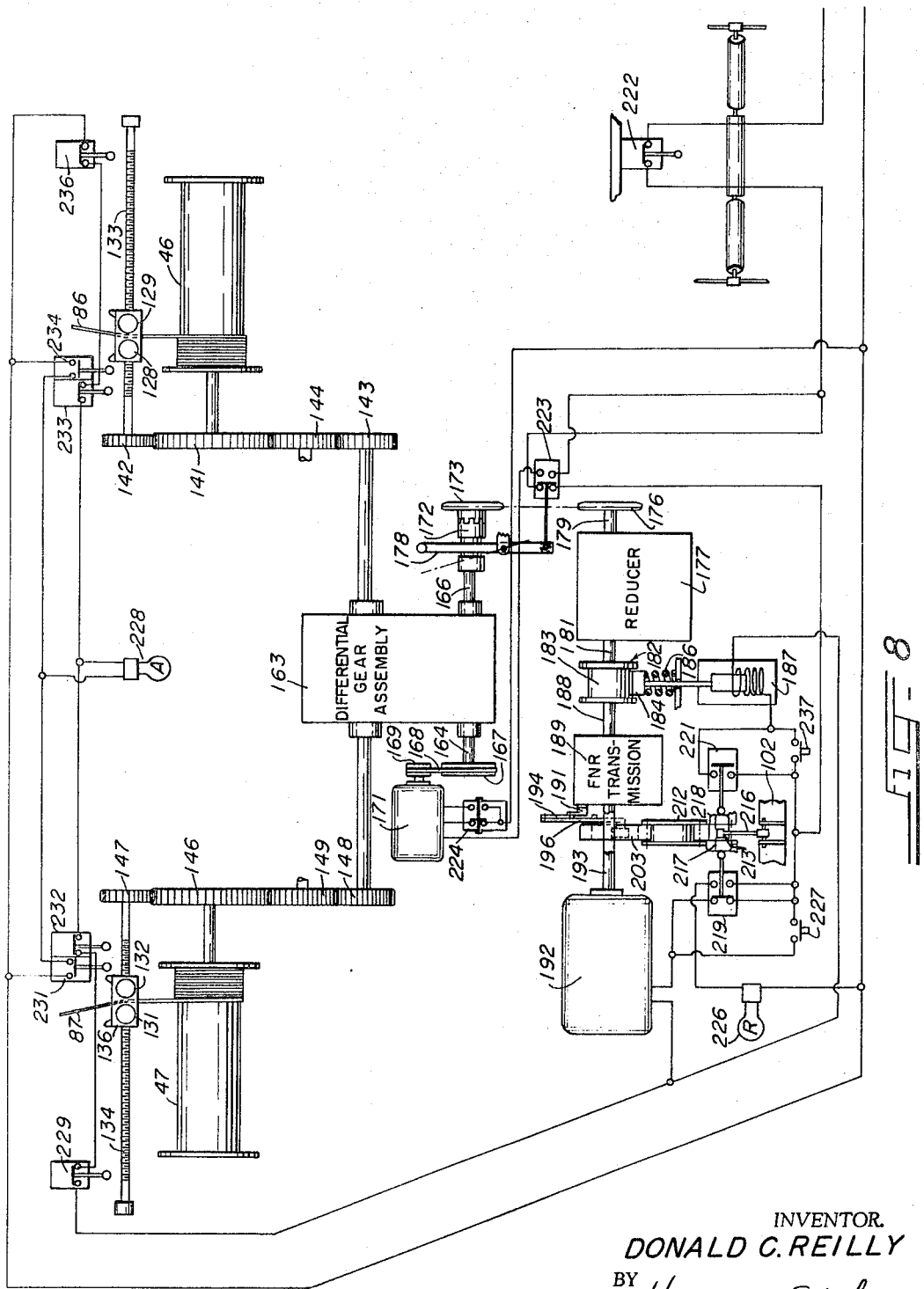

3,310,158
TENSION EQUALIZER FOR FLEXIBLE STRAND SIDEFRAME CONVEYOR

Donald C. Reilly, Downers Grove, Ill., assignor, by mesne assignments, to Westinghouse Air Brake Company, Pittsburgh, Pa., a corporation of Pennsylvania
Filed Sept. 24, 1963, Ser. No. 311,123
10 Claims. (Cl. 198—139)

This invention relates generally to belt conveyors and more particularly to a flexible strand sideframe conveyor.

In recent years a new variety of belt conveyor, having tensioned flexible sideframes, has come into widespread use. In such conveyors it is desirable to maintain tension at approximately equal values in each side in order to provide equal catenary curves and avoid longitudinal racking under changing tension conditions. This has usually been done by separately tensioning each side and comparing initial values of tension.

It is an object of the present invention to provide means for tensioning the two sideframes together and dividing the total tension equally between the two side strands.

Another object is to provide means for automatically maintaining tension within predetermined limits while equalizing tension between the two side strands.

A further object is to automatically maintain equalized tension within predetermined limits while the conveyor length is undergoing change.

Other objects and advantages will become apparent from the following description together with the drawings.

In the drawings:
FIGURE 1 is a side elevation view of the discharge end of the conveyor of the present invention;
FIG. 2 is a side elevation view of the inbye end of the conveyor shown in FIG. 1;
FIG. 3 is a transverse section view taken along the line 3—3 of FIG. 2, showing the loading hopper;
FIG. 4 is a transverse section view taken along the line 4—4 of FIG. 2, showing the rope tensioning unit;
FIG. 5 is a plan view of the rope tensioning unit shown in FIG. 4;
FIG. 6 is a fragmentary elevation view, to enlarged scale, of a control device for the tensioning unit;
FIG. 7 is a transverse section view of a cam and follower taken along the line 7—7 of FIG. 6;
FIG. 8 is a schematic diagram of control devices for the tensioning unit; and
FIG. 9 is a cross section view of a tunnel showing a tunneling machine and conveyor in place.

Referring now more particularly to the drawings, the numeral 10 generally indicates a belt conveyor having a pair of rope sideframes 11 and 12. Troughing roller assemblies 13 are supported between the pair of ropes, and support a material carrying reach of belt 14. Belt 14 is wrapped around outbye pulley 16 and extends to drive unit 17 where it is wrapped around drive pulleys 18 and 19. Motor 21 is mounted on base 22 and is drivingly connected to pulleys 18 and 19 by reduction gearing and drive chains indicated generally by chain guard 23. The return reach of the belt extends from drive pulley 19 to fixed and movable stacks of reversing pulleys 24 and 26. From pulley 26, belt 15 extends toward the inbye end of the conveyor, to and around inbye pulley 27. A hopper 28 is fitted over the inbye end of belt 14 to distribute the load evenly.

Movable pulleys 26 are journaled on a carriage 25 which is longitudinally movable along rails 20. A rope 35 is connected between carriage 25 and winch 40. Wheels 45 support winch 40 for movement relative to frame 50. A nest of springs 55 separates winch 40 from frame 50 and provides tension for belt 14.

Rope 11 is tied off to the outbye unit near outbye pulley 16 by connectors 29 and are supported by stand 31 mounted on outbye boom 32. Stand 31 is pivotally connected to mounting bracket 33 which has a plurality of locating holes 34 to correct for the angularity of boom 32. Boom 32 is angularly adjustable by means of jack stand 36 to vary the height of discharge pulley 16. The ropes are supported on further stands 37, 38, 39 and extend toward the rope tensioning unit. Before reaching the tensioning unit, rope 11 is tied off to anchor member 84. Another pair of ropes 86 and 87 are also tied off to anchor 84 and extend in alignment with ropes 11 and 12. At the tensioning unit, ropes 86 and 87 are reeved around inclined pulley 41, 42, 43 and 44 and extend respectively to upper winding drum 46 and lower winding drum 47. A pair of short lengths of ropes 48 and 49 extend forwardly in line with ropes 86 and 87 along the inbye unit under hopper 28. These extension ropes rest in support brackets 51, 52 and are fastened at their ends to inbye rigid frame members 53, 54 by resilient sockets 56 and 57. Inbye rigid frame members 53 and 54 are constructed with risers 58, 59, 61 and 62 for attachment of inbye pulley 27 and connection to the tensioning unit.

A tunnel boring machine is adapted to have its rear end supported on a telescopically adjustably jack 63, pin connected to a truck assembly 64. Flanged wheels 66 support truck assembly 64 on rails 67 and 67'. Ring beams 68 are wedged against tunnel wall 69 and have steps 71 on which rails 67 and 67' are supported. A chute 72 extends from the conveying elements of the boring machine and conducts broken and dislodged material into hopper 28. Other frame members of the boring machine are indicated by reference characters 73, 74 and 76.

A pair of shelf-like mounting members 77 and 78 are connected to truck assembly 64. Mounting member 78 is shown to be pin-connected to truck assembly 64 by pins 79 and 81 and has a downwardly extending leg 82. An outwardly extending beam 83 is connected to leg 82 and is secured to rigid frame members 53 and 54 between risers 58, 61 and 59, 62. Mounting member 78 is further supported on the machine by rods 88 connected between machine frame member 76 and beam 83. Thus the inbye portion of the conveyor is supported on and securely connected to a tunnel boring machine for forward and backward movement with the machine.

Referring now to FIGS. 2, 4 and 5, the tensioning unit is supported on rail 67 by flanged wheels 89. A pair of lower beams 91, 92 are cross connected by members 93 and connected to risers 58 and 59 of the inbye unit. A pair of longer vertical members 94 extend upwardly from beam 92 to support an upper beam 96. An upwardly and outwardly extending offset box structure 97 extends from lower beam 91 and provides support for flanged wheels 89. A pair of shorter vertical members 98 extend upwardly from box member 97 to support an upper beam 99. Upper beams 96 and 99 are cross connected by channel 101 and angle 102. Additional bracing is provided by channel member 103 and inclined members 104, 106. Upper beams 96 and 99 carry V-rails 107 and 108 which engage wheels 109, 111, 112, 113. A bodily movable carriage 114 is supported by wheels 109, 111, 112, and 113 for movement forward and backward relative to the tensioning unit frame along rails 107 and 108. A pair of compression springs 116, 117 are located between the tensioning unit frame and carriage 114, biasing carriage 114 for movement toward the right as viewed in FIG. 2.

A pair of winding drums 46 and 47 are journaled on carriage 114 in bearings 118, 119, 121 and 122. Ropes 86 and 87 are led onto winding drums 46 and 47 by guide sheaves 123, 124, 126, 127 and spooling sheaves 128, 129, 131 and 132. The spooling sheaves are mounted in translatable assemblies 136, 137 movable along the drums on lead screws 133 and 134. Rope 86 is secured in a slot in the flange of winding drum 46, and rope 87 is similarly secured to drum 47. The direction of drum rotation and rope reeving is such that when the drums wind up the rope, the carriage on which the drums are mounted moves to the left as viewed in FIG. 2 to compress springs 116 and 117. As shown in FIG. 5, springs 116 and 117 are enclosed in the tubular members 138 and 139 which are arranged to abut the carriage and prevent compression beyond a predetermined amount.

Upper drum 46 has a spur gear 141 connected to its shaft which drives pinion 142, connected to lead screws 133. Spur gear 141 is driven by pinion 143 through reach gear 144. Lower drum 47 has a spur gear 146 connected to its shaft which drives pinion 147, connected to lower lead screw 134. Spur gear 146 is driven by pinion 148 through reach gear 149. Pinion 143 is mounted on shaft 151 which is supported in pillow block 152, 153 and extends into connection with coupler 154. Pinion 148 is connected to shaft 156 which is supported in pillow blocks 157, 158 and extends into coupler 159. Couplers 154 and 159 are connected to power output shafts 161 and 162 extending from differential gear assembly 163. A pair of power input shafts 164 and 166 extend from differential gear assembly 163. Shaft 164 has a V-belt pulley 167 connected to it. A V-belt 168 connects V-belt pulley 167 with a V-belt pulley 169 on auxiliary motor 171. The other power input shaft 166 is connected to a releasable clutch 172 which is also connected to sprocket 173. A pivoted shifting lever 178 cooperates with clutch 172 to shift it from connecting to disconnecting position. A roller chain 174 connects sprocket 173 with another sprocket 176 on the output shaft 179 of a gear reducer 177.

Input shaft 181 of reducer 177 has a brake 182 indicated schematically in FIG. 8 by brake drum 183 and brake shoe 184. Spring 186 biases shoe 184 in a direction to apply braking force to drum 183 and solenoid 187 biases shoe 184 in a direction to release the braking force when energized. Output shaft 188 of reversible transmission 189 is connected to brake drum 183. A shifting lever 191 on transmission 189 is effective to control the rotation of output shaft 188 for forward, neutral, and reverse conditions of operation. A main motor 192 has shaft 193 connected to the input of transmission 189.

Referring now to FIGS. 6, 7 and 8, the control apparatus for shiftable transmission 189 will be described. Shifting lever 191 is pivotally connected to link 194 which is also connected to bell crank 196. A pivot pin 197 connects bell crank 196 to a plate 198 on carriage 114. A guide structure on carriage 114 has a front plate 199 which has been broken away in FIG. 6 to more clearly show the operative mechanism of the control apparatus. A rear plate 201 is generally similar to plate 199 but has a portion cut away to permit insertion and operation of bell crank 196. A number of rollers 202 are journaled in plates 199 and 201. A cam member 203 has upper and lower races 204 and 206 adapted to engage rollers 202. Cam member 203 has an internal camming surface with three steps 207, 208 and 209. A follower 211 on bell crank 196 runs along the camming surface in response to longitudinal movement of cam member 203. A link 212 connects cam member 203 with lever 213. Lever 213 is pivoted to carriage 114 by pin 214. A connector 216 is pivoted to lever 213 between its connections to the carriage and link 212. The opposite end of connector 216 is secured to angle 102 on the tensioning unit.

Lever 213 has a pair of triggering surfaces 217 and 218 for operating electrical plunger switches 219 and 221. Other electrical switches, whose operation will be described, are overtravel switch 222 and switches 229, 231, 232, 233, 234 and 236 associated with the rope spooling apparatus.

In operation, a pair of ropes 86 and 87 each have an end secured to respective of drums 46 and 47. Shifting lever 178 is moved to disengage clutch 172. Disengagement of clutch 172 interrupts the power train from main motor 192. Actuation of shifting lever 178 also engages switch 223 which breaks the electrical connection to main motor 192 and makes the connection to one side of the line for auxiliary motor 171. Actuation of switch 224 for winding closes the other side of the line in the auxiliary motor circuit. Auxiliary motor 171 then drives differential 163 which drives drums 46 and 47 in a winding direction to wind up ropes 86 and 87. When sufficient rope has been wound on drums 46 and 47, switch 224 is opened to de-energize auxiliary winding motor 171. At this point the loose ends of ropes 86 and 87 are clamped to anchor 84. Shifting lever 178 is moved in a direction to engage clutch 172 and establish a circuit to switches 219 and 221 through switch 223. If desired, it is possible to wind multiple layers of ropes on drums 46 and 47 before making connection to anchor 84. This permits several extensions to be made before reeving in a new supply of rope.

In this condition, springs 116 and 117 have moved carriage 114 to the extreme right as viewed in FIGS. 2 and 6. In this position transmission 189 is in the wind-up condition and triggering surfaces 217 and 218, on lever 213, have moved away from the plungers of switches 219 and 221. Switch 221 then energizes solenoid 187 to release brake 184 and switch 219 de-energizes main motor 192 and energizes red indicator light 226. When light 226 is lit, it indicates that manual jogging switch 227 must be used to activate the tensioning device. Depressing jogging switch 227 establishes a circuit to main motor 192. Motor 192 drives through transmission 189, which has been shifted to winding condition, and through the power train to winding drums 46 and 47. As winding drums 46 and 47 wind up ropes 86 and 87, carriage 114 moves toward the left, as viewed in FIGS. 2 and 6, against the bias of springs 116 and 117. The compression of springs 116 and 117 establishes the tension on ropes 86 and 87 and the differential gearing 163 equalizes the tension between the two ropes.

When springs 116 and 117 have been compressed far enough to establish operating tension on ropes 86 and 87, carriage 114 has moved far enough to re-establish contact between triggering surfaces 217, 218 and switches 219, 221. This position of the carriage 114 also shifts transmission 189 to the neutral condition of operation. Contact between trigger surface 218 and switch 221 de-energizes solenoid 187 which permits application of brake 182 to hold drums 46 and 47 against rotation under power derived from motor 192. Drums 46 and 47 of course remain free to rotate modest amounts relative to one another in response to externally derived changes in strand tension conditions of a magnitude insufficient to actuate the camming mechanism of FIGURE 6. Contact between trigger surface 217 and switch 219 breaks the circuit to indicator light 226 and simultaneously establishes a circuit to main winding motor 192 independently of jogging switch 227. Thus, when the red indicator light goes out, it is an indication that the tensioning unit is functioning automatically in response to rope tension and the jogging switch 227 can be released.

Once the tensioning unit is operating automatically in response to rope tension, the tunnel driving can proceed. As the tunneling machine proceeds, the inbye unit and rope tensioning unit are pulled to the left as viewed in FIG. 2. Inbye pulley 27 pulls additional conveyor belt from the belt storage unit indicated by pulleys 24 and 26 to increase the length of the conveyor. The rope tensioning unit provides additional rope to lengthen the side frames in the following described manner.

As the tensioning unit is moved to the left, in FIG. 2, by the tunneling machine, carriage 114 is moved toward the left at twice the velocity of the tensioning unit with the result that the carriage 114 moves relative to the tensioning unit. This relative movement moves cam plate 203 to the right in FIG. 6 so that transmission 189 is shifted to the unwinding position. Triggering surface 218 is shorter than triggering surface 217 so that brake 182 is released while motor 192 is still energized. This results in powered unwinding of rope from drums 46 and 47. It should be noted that the force of springs 116 and 117 is sufficient to unwind rope when the brake is released except when the tunneling machine is moving forwardly at its maximum rate of advance. As rope is unwound from drums 46 and 47, carriage 114 is urged to the right in FIG. 2 by springs 116 and 117 with the result that cam plate 203 and bell crank 196 cooperate to shift transmission 189 to neutral, and triggering surface 218 actuates switch 221 to re-apply brake 182.

It is sometimes necessary to draw the tunneling machine back from the face during operation such as when a face fall has choked the head. When the machine moves backward, carriage 114 moves to the right as viewed in FIGS 2 and 6. This causes cam plate 203 to move toward the left to shift transmission 189 to the winding condition of operation through bell crank 196. Winding drums 46 and 47 then wind up ropes 86 and 87 until proper rope tension is re-established. When proper tension is re-established, cam plate 203 moves to an intermediate position which shifts transmission 189 to neutral.

As ropes 86 and 87 are unwound from drums 46 and 47, spooling assemblies 136 and 137 move along lead screws 133 and 134. When the rope is nearly unwound the spooling assemblies engage switch 231 or 234 to energize amber warning light 228. If the machine is operated to wind off all the rope, the spooling assemblies engage switches 232 or 233 to break the circuit to main motor 192. The switches have counter-parts 229 and 236 which also break the circuit to main motor 192 when too much rope is wound on the drums.

When ropes 86 and 87 have been unwound from drums 46 and 47 so that switches 232 or 233 have shut down main motor 192, it is necessary to tie off the ropes by clamping them to ring beams 68 in order to hold tension on the conveyor structure. Auxiliary switch 237 is then operated to energize solenoid 187 to release brake 184. With brake 184 released, tension in the remainder of ropes 86 and 87 is released. If necessary, the tunneling machine can be backed up to provide enough rope slack. Once the remainder of ropes 86 and 87 is slack, clutch 172 is released by movement of shifting lever 178 which establishes a circuit to motor 171 through switch 223. Thereafter, drums 46 and 47 can be operated in either direction of rotation by auxiliary motor 171 and reversing switch 224 independently of switches 232 and 233.

A safety switch 222 is arranged to engage the first idler assembly when the conveyor is being shortened. Thus, if the tunneling machine is backed up too far, the electrical circuit to the tensioning unit will be opened to indicate that the operator's attention is needed.

While I have shown and described a preferred embodiment of my invention, it is to be understood that other forms and embodiments can be practiced within the spirit of the invention and the scope of the following claims.

I claim:
1. In a multi-strand conveyor in which conditions of under tension, operating tension, and over tension exist for intermittent intervals of time in the strands,
 a pair of laterally spaced flexible strands forming side frames on which belt supporting rollers are carried,
 a pair of rotatable winding drums,
 differential means differentially connecting the rotatable winding drums to each other, each drum having a respective one of said strands secured to it,
 power means connected to said drums through the differential means and operable to drive said drums in a direction to increase tension on said strands,
 control means operable to positively place said power means in a locked condition in which power transmission from the power means to the drums is non-drivingly connected to the differential means, and a winding condition in which the power means is drivingly connected to the differential means, responsive, respectively, to operating tension and under tension in the flexible strand side frames,
 said winding drums being differentially rotatable relative to each other to equalize tension between the strands in a system condition in which the power means is non-drivingly connected to the differential means.

2. In a multi-strand conveyor in which conditions of under tension, operating tension, and over tension exist for intermittent intervals of time in the strands,
 a pair of laterally spaced flexible strands forming side frames on which belt supporting rollers are carried,
 a pair of rotatable winding drums,
 differential means differentially connecting the rotatable winding drums to each other, each drum having a respective one of said strands secured to it,
 power means connected to said drums through the differential means and operable to drive said drums in winding and unwinding directions, and
 control means operable to positively place said power means in a locked condition in which power transmission from the power means to the drums is non-drivingly connected to the differential means, a winding condition in which the power means is drivingly connected to the differential means for drive in a first direction, and an unwinding condition in which the power means is drivingly connected to the differential means for drive in a second direction, responsive, respectively, to operating tension, under tension, and over tension in the flexible strand side frames,
 said winding drums being differentially rotatable relative to each other to equalize tension between the strands in each of the locked winding and unwinding operating conditions.

3. The multi-strand conveyor of claim 2 further characterized,
 in that the rotatable winding drums are connected to each other by differential gearing, said power means being connected to the differential gearing.

4. The multi-strand conveyor of claim 3 further characterized,
 firstly, in that the rotatable winding drums are interconnected to each other by differential gearing which permits relative rotation of said drums with respect to each other for equalizing the tension in said strands,
 secondly, that the differential gearing is connected to a shiftable transmission which is in driving relationship therewith, said transmission having winding, unwinding and locked neutral conditions of operation,
 thirdly, in that the power means is drivingly connected to the transmission, and
 fourthly, that the control means are tension responsive, said control means being connected to said transmission to thereby positively place said transmission in the appropriate condition of operation in response to varying conditions of tension in the strands.

5. The multi-strand conveyor of claim 2 further characterized,
 firstly, in that the rotatable drums are differentially interconnected, said pair of drums being bodily shiftable forward and back in accordance with changes in tension in said pair of strands,
 secondly, that the power means are connectable to the winding drums by selector means which selectively connect said power means to said pair of drums for winding or unwinding rotation, or disconnect the power means from the drums, and thirdly, in that the control means are connected to the selector means and are effective to select, locked, winding or unwinding rotation of said drums.

6. In an extensible belt conveyor having a carrying reach of belt stretched between an outbye unit and a longitudinally movable inbye unit;
   a pair of laterally spaced wire ropes extending between said inbye and outbye units forming side frames to which belt supporting rollers are connected, one end of each rope being fixed relative to said outbye unit;
   a carriage movable forward and back relative to said inbye unit;
   a pair of differentially interconnected winding drums on said carriage, each drum having a respective one of said wire ropes secured to it for winding around its surface, said drums and carriage being movable in response to changes in rope tension;
   power means selectively connectable to said winding drums to drive said drums in a direction to increase rope tension; and
   selector means on said inbye unit effective to connect said power means to said drums in response to relative movement of said inbye unit with respect to said carriage.

7. In an extensible belt conveyor having a carrying reach of belt stretched between an outbye unit and a longitudinally movable inbye unit;
   a pair of laterally spaced wire ropes extending between said inbye and outbye units forming side frames to which belt supporting rollers are connected, one end of each rope being fixed relative to said outbye unit;
   a carriage movable forward and back relative to said inbye unit;
   a pair of differentially interconnected winding drums on said carriage, each drum having a respective one of said wire ropes secured to it for winding around its surface, said drums and carriage being movable in response to changes in rope tension;
   power means selectively connectable to said winding drums to drive said drums in a direction to increase rope tension;
   a releasable brake on said power means; and
   control means on said inbye unit effective to selectively release said brake and connect said power means to said drums in response to relative movement between said inbye unit and said carriage.

8. In an extensible belt conveyor having a carrying reach of belt stretched between an outbye unit and a longitudinally movable inbye unit;
   a pair of laterally spaced wire ropes extending between said inbye and outbye units forming side frames to which belt supporting rollers are connected, one end of each rope being fixed relative to said outbye unit;
   a carrriage movable forward and back relative to said inbye unit;
   a pair of differentially interconnected winding drums on said carriage, each drum having a respective one of said wire ropes secured to it for winding around its surface, said drums and carriage being movable in response to changes in rope tension;
   power means selectively connectable to said winding drums for winding and unwinding directions of rotation; and
   selector means on said inbye unit effective to shift said power means between conditions of winding and unwinding rotation in response to relative movement between said inbye unit and said carriage.

9. In an extensible belt conveyor having a carrying reach of belt stretched between an outbye unit and a longitudinally movable inbye unit;
   a pair of laterally spaced wire ropes extending between said inbye and outbye units forming side frames to which belt supporting rollers are connected, one end of each rope being fixed relative to said outbye unit;
   a carriage movable forward and back relative to said inbye unit;
   a pair of differentially interconnected winding drums on said carriage, each drum having a respective one of said wire ropes secured to it for winding around its surface, said drums and carriage being movable in response to changes in rope tension;
   power means selectively connectable to said winding drums for winding and unwinding directions of rotation;
   a releasable brake on said power means; and
   selector means on said inbye unit effective to release said brake and connect said power means for either winding or unwinding rotation in response to the relative position of said carriage with respect to said inbye unit.

10. In an extensible belt conveyor having a carrying reach of belt stretched between an outbye unit and a longitudinally movable inbye unit;
    a pair of laterally spaced wire ropes extending between said inbye and outbye units forming side frames to which belt supporting rollers are connected, one end of each rope being fixed relative to said outbye unit;
    a carriage movable along said inbye unit;
    a pair of winding drums on said carriage, each drum having a respective one of said wire ropes secured to it for winding around its surface;
    biasing means urging said carriage in a direction to increase tension in said ropes;
    differential gearing interconnecting said winding drums permitting relative rotation between said drums for equalizing tension between the pair of ropes;
    shiftable transmission gearing connectable to said differential gearing having shifting means for selecting winding, neutral or unwinding conditions of operation for said winding drums;
    a releasable brake on said transmission gearing;
    a unidirectional motor drivingly connected to said transmission;
    a three step camming surface connected to said inbye unit by motion multiplying mechanism, each step corresponding to one of the conditions of operation of said winding drums;
    a follower operatively connected to the shifting means of said transmission adapted to successively engage the steps of said camming surface upon movement of said carriage with respect to said inbye unit; and
    control means for said brake, operable responsive to movement of said motion multiplying mechanism effective to lock said winding drums against rotation when said transmission gearing is connected for neutral operation.

References Cited by the Examiner

UNITED STATES PATENTS

| | | | |
|---|---|---|---|
| 2,393,048 | 1/1946 | Mahnke | 254—172 X |
| 2,858,932 | 11/1958 | Risse | 198—139 |
| 2,984,455 | 5/1961 | Fischer | 254—185 X |
| 3,015,473 | 1/1962 | Frellsen | 198—139 X |

EVON C. BLUNK, *Primary Examiner.*

SAMUEL F. COLEMAN, *Examiner.*

R. J. HICKEY, *Assistant Examiner.*